Patented May 12, 1942

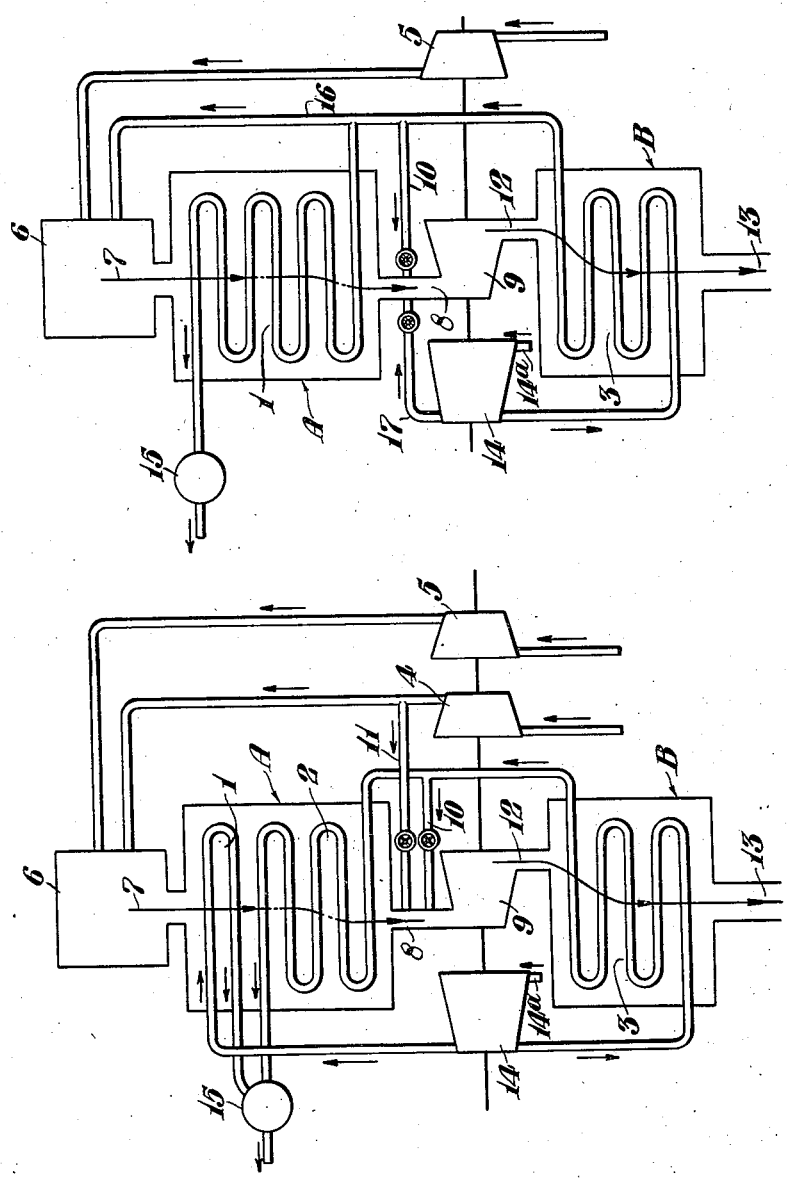

2,282,740

UNITED STATES PATENT OFFICE 2,282,740

HEAT EXCHANGE SYSTEM

Walter Gustav Noack, Baden, Switzerland, assignor to Aktiengesellschaft Brown, Boveri & Cie., Baden, Switzerland Application November 7, 1939, Serial No. 303,286
In Germany November 11, 1938

2 Claims. (Cl. 263—19)

This invention relates to a heat exchanger for heating gases under pressure, and more particularly to a blast heater for supplying hot air under pressure to a blast furnace.

The heat exchanger is of the multi-stage type and preferably is a two stage heat exchanger having an upper stage into which the hot gases from a combustion chamber are delivered and a lower stage from which the spent hot gases are exhausted. The heating gases and the air or the like to be heated flow through the heat exchanger in passages separated by metallic walls, i. e. in indirect heat exchange contact, and preferably in counter-current flow. The heat exchanger is divided into an upper and a lower stage chiefly for reasons of manufacture. The tubes or heat exchange surfaces of the upper stage are made of expensive highly heat-resistant materials because they are subjected to the highest temperatures.

The combustion chamber for supplying heating gases to the heat exchanger operates under a pressure considerably above atmospheric, and the heating gases which flow through the upper stage of the heat exchanger are at approximately the pressure of the combustion chamber.

The super-atmospheric pressure in the combustion chamber and upper stage of the heat exchanger is established by forcing air for combustion into said chamber from an air compressor which is driven by a gas turbine. The gas turbine is positioned between the upper and lower stages of the heat exchanger and motivating gases for driving the turbine are supplied in part by the heating gases from the upper stage and in part from a source of cooler gas under pressure as will be presently explained. Exhaust gases from the turbine pass into the lower stage of the heat exchanger. Preferably, the gas turbine also drives a compressor for supplying fuel to the combustion chamber.

The gas turbine drives not only the fuel compressor and the compressor for supplying combustion air to the combustion chamber but also furnishes power for compressing the air to be heated or the hot blast. The air for the hot blast and the combustion air may be supplied by a single air compressor or separate air compressors may be employed to supply each use.

The output of the gas turbine must be very high in order to drive the several compressors referred to. Also, it is desirable to heat the air for the hot blast to the highest practical temperature in the heat exchanger. To this end, a large input of heat energy must be supplied by the combustion.

The temperature of the products of combustion leaving the upper stage of the heat exchanger under such conditions is too high to permit the products of combustion to be used directly for driving the hot gas turbine because the materials of construction of the turbine will not stand the high temperature.

In order to achieve these operating conditions, according to the invention, means is provided for mixing a quantity of cooler air under pressure with the hotter products of combustion passing from the upper stage of the heat exchanger to the gas turbine whereby to produce a turbine motivating gas of intermediate temperature, of sufficient volume and at a sufficient pressure to drive the gas turbine.

The air to be bled into the turbine motivating gases may be taken from either the compressor for the combustion air or from the compressor for the blast to be heated. It can, however, be preheated compressed air taken from the tubes of the heat exchanger carrying the air being heated for the blast.

The compressor for the blast to be heated and the compressor for the combustion air advantageously can be combined as a unitary compressor supplying both uses.

The invention will be more particularly described by way of illustration with reference to the accompanying drawing in which:

Fig. 1 is a diagrammatic representation of a heat exchange system embodying the principles of the invention; and Fig. 2 is a diagrammatic representation of a modified embodiment of the invention.

In Fig. 1, 14 is the compressor for the air blast to be heated, having an air inlet at 14a. 1 and 2 are the tubes (or heating surfaces) of the upper stage A, 3 those of the lower stage B of a heat exchange device for heating an air blast. 4 is the compressor for the combustion air and 5 is the compressor for the fuel. The two gases are burned in the combustion chamber 6 and pass through 7 to the upper stage A of the heat exchanger as hot gas and thence through 8 to the gas turbine 9. The pressure within the chamber A should not greatly exceed the pressure within the tubes 1, 2, because at the high temperature obtaining the tubes are not capable of withstanding a high pressure differential. On the other hand, the turbine, in view of the strength of the vanes, cannot safely withstand the high temperatures of the hot gases leaving chamber A but should be supplied with a motive gas at a temperature not above about 550° C. In order to compress the amounts of air required with motive gas at this temperature, the turbine must be supplied with an amount of such relatively cooler motive gas which is not substantially less than the total amount of air to be compressed. In order to meet these requirements, a certain amount of air is introduced into the hot gases passing through conduit 8 from the compressor for the blast to be heated, through pipe 10, or from the compressor for the combustion air, through pipe 11, this added air serving the two purposes of (1) cooling the hot gases to a temperature (e. g., 550° C.) which will not be harmful to the turbine vanes and (2) increasing the volume of the turbine motive fluid to the quantity sufficient to supply the necessary compressing capacity. Since this added air does not have the temperature that it must have as motive fluid for the gas turbine, the temperature of the hot gas leaving at 8 must be maintained somewhat higher and the added air warmed up by the excess heat in the latter.

The motive gases leave the gas turbine at 12, and then enter the lower stage B of the heat exchange device. They pass into the open air at 13 or into an exhaust gas pipe.

Although with this method of operation, it is possible to carry on the combustion in the combustion chamber 6 with sufficiently high air excess that inadmissibly high hot gas temperatures are avoided, it may be advisable for reasons of economy of piping to supply cold blast to the tubes which are first contacted with the hot heating gases, as is shown in Fig. 1. A portion of the air to be heated from the compressor 14 passes to the group of tubes 1 in stage A and a portion to the group of tubes 3 in lower stage B. Both portions come together in the collector 15.

The illustrative embodiment of Fig. 2 differs from that of Fig. 1 only in that here the compressor for the blast 14 provides both the combustion air and the air to be mixed with the turbine motivating gases. 16 is the branch for the combustion air, 10 that for the air to be mixed with the turbine motivating gases. This air is already preheated in stage B. Cold air may, of course, be taken likewise from pipe 17.

In general, the pressure of the motive gas before entrance into the gas turbine will be practically the same as the pressure of the blast, since in this way, as already mentioned, the stress on the tubes in the upper stage will be least.

In Figs. 1 and 2 of the drawing, the combustion chamber is shown separate from the heat exchange device. It may, of course, be combined with the upper stage of the heat exchanger.

The great advantage of increasing the amount of motive gas instead of raising the motive gas pressure drop consists, in brief, in the circumstance that the efficiency of the compressor for large volumes and small pressures is very much higher than that for large pressures and small volumes, and in addition the temperature in front of the gas turbine can be lower and the pressure on both sides of the walls of the tubes is about equal, so that high temperatures can be used and materials highly resistant to scaling but of lower strength can be employed for the tubes. For such reasons, this method of operation is far superior to the use of exhaustors.

I claim:

1. A hot blast plant comprising, in combination, a multi-stage metallic heat exchanger for heating the blast, said heat exchanger comprising a high temperature stage and a low temperature stage, a combustion chamber for supplying hot combustion gases under pressure to the high temperature stage of said heat exchanger, a gas turbine supplied with hot motive gases from the high temperature stage of the heat exchanger and exhausting into the low temperature stage of the heat exchanger, a compressor driven by said gas turbine for supplying compressed fuel to said combustion chamber, compressor means driven by said gas turbine for supplying compressed air to the low temperature stage of the heat exchanger for the blast to be heated and to the combustion chamber, and means by-passing the combustion chamber and the high temperature stage of the heat exchanger for introducing a portion of the compressed air from said compressor means into the stream of hot motive gases supplied to the gas turbine from the high temperature stage of the heat exchanger.

2. A hot blast plant comprising, in combination, a multi-stage metallic heat exchanger for heating the blast, said heat exchanger comprising a high temperature stage and a low temperature stage, a combustion chamber for supplying hot combustion gases under pressure to the high temperature stage of said heat exchanger, a gas turbine supplied with hot motive gases from the high temperature stage of the heat exchanger and exhausting into the low temperature stage of the heat exchanger, a compressor driven by said gas turbine for supplying compressed fuel to said combustion chamber, an air compressor driven by said gas turbine, means for conveying a portion of the compressed air from said air compressor to the low temperature stage of said heat exchanger, means for conveying a portion of the heated compressed air from said low temperature stage to said high temperature stage, means for conveying another portion of the heated compressed air from said low temperature stage to said combustion chamber, means for bleeding another portion of the heated compressed air from said low temperature stage into the stream of hot motive gases supplied to said gas turbine, and means for bleeding a portion of the compressed air from said air compressor directly into the stream of hot motive gases supplied to said gas turbine.

WALTER GUSTAV NOACK.